US010684530B1

United States Patent
Bian et al.

(10) Patent No.: US 10,684,530 B1
(45) Date of Patent: Jun. 16, 2020

(54) ELECTRO-OPTIC MODULATORS WITH LAYERED ARRANGEMENTS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Abu Thomas, Brookline, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/288,634

(22) Filed: Feb. 28, 2019

(51) Int. Cl.
G02F 1/29 (2006.01)

(52) U.S. Cl.
CPC .......... *G02F 1/29* (2013.01); *G02F 2201/066* (2013.01); *G02F 2203/10* (2013.01)

(58) Field of Classification Search
CPC ... G02F 1/29; G02F 2201/066; G02F 2203/10
See application file for complete search history.

(56) References Cited

U.S. PATENT DOCUMENTS

| | | | | |
|---|---|---|---|---|
| 8,873,895 | B2* | 10/2014 | Fujikata | G02F 1/025 385/1 |
| 9,002,144 | B2* | 4/2015 | Fujikata | G02F 1/025 385/132 |
| 9,703,125 | B2* | 7/2017 | Fujikata | G02F 1/025 |
| 2009/0263078 | A1* | 10/2009 | Hosomi | G02B 6/12004 385/14 |
| 2012/0207424 | A1* | 8/2012 | Zheng | G02B 6/1228 385/2 |
| 2012/0257850 | A1* | 10/2012 | Fujikata | G02F 1/025 385/3 |
| 2015/0212344 | A1* | 7/2015 | Patel | G02B 6/132 385/2 |
| 2015/0280832 | A1* | 10/2015 | Fujikata | H04B 10/5561 398/25 |
| 2016/0349594 | A1 | 12/2016 | Wurtz et al. | |
| 2018/0246351 | A1* | 8/2018 | Ho | G02F 1/01708 |

OTHER PUBLICATIONS

Sorger et al., "Ultra-compact silicon nanophotonic modulator with broadband response", Nanophotonics, 1(1), pp. 17-22. Retrieved Feb. 28, 2019, from doi:10.1515/nanoph-2012-0009.
Lee et al., "Nanoscale Conducting Oxide PlasMOStor", Nano Lett. 2014, 14, 11, 6463-6468.

(Continued)

*Primary Examiner* — Sung H Pak
(74) *Attorney, Agent, or Firm* — Thompson Hine LLP; Francois Pagette

(57) ABSTRACT

Structures for an electro-optic modulator and methods of fabricating a structure for an electro-optic modulator. An electro-optic modulator is arranged over a portion of a waveguide core. The electro-optic modulator includes an electrode, an active layer arranged adjacent to the electrode, and a dielectric layer including a portion that has a lateral arrangement between the electrode and the active layer. The active layer is composed of a material having a refractive index that is a function of a bias voltage applied to the electrode and the active layer.

20 Claims, 5 Drawing Sheets

(56) References Cited

OTHER PUBLICATIONS

Vasudev et al., "Electro-optical modulation of a silicon waveguide with an "epsilon-near-zero" material", Opt. Express 21, 26387-26397 (2013).

Krasavin, et al., "Photonic Signal Processing on Electronic Scales: Electro-Optical Field-Effect Nanoplasmonic Modulator", Phys. Rev. Lett. 109, 053901—Published Jul. 31, 2012.

Yang et al., "High-performance Si photonics interposer featuring RF travelling-wave electrode (TWE) via Cu—BEOL", 2015 Optical Fiber Communications Conference and Exhibition (OFC).

* cited by examiner

ELECTRO-OPTIC MODULATORS WITH LAYERED ARRANGEMENTS

BACKGROUND

The present invention relates to photonics chips and, more specifically, to structures form an electro-optic modulator and methods of fabricating a structure for an electro-optic modulator.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

A photonics chip may include an electro-optic modulator used as an optical switch to selectively route an incoming optical signal from an input to a destination output without converting the optical signal to an electrical signal. For example, through the modulation, the selective routing can be utilized to convert an arriving continuous optical signal into a departing encoded data stream. Optical switches may be formed, for example, using Mach-Zehnder interferometer (MZI) modulators. A disadvantage of this type of switching is that MZI modulators exhibit a weak electro-optic effect and, for that reason, MZI modulators must have a large form factor that results in a large footprint on the photonics chip. During operation, MZI modulators also tend to consume large amounts of power.

Improved structures for an electro-optic modulator and methods of fabricating a structure for an electro-optic modulator are needed.

SUMMARY

In an embodiment of the invention, a structure includes a waveguide core, and an electro-optic modulator arranged over a portion of the waveguide core. The electro-optic modulator includes an electrode, an active layer arranged adjacent to the electrode, and a dielectric layer including a portion that has a lateral arrangement between the electrode and the active layer. The active layer is composed of a material having a refractive index that is a function of a bias voltage applied to the electrode and the active layer.

In an embodiment of the invention, a method includes forming an electro-optic modulator that is arranged over a portion of a waveguide core. The electro-optic modulator includes an electrode, an active layer arranged adjacent to the electrode, and a dielectric layer including a portion that has a lateral arrangement between the electrode and the active layer. The active layer is composed of a material having a refractive index that is a function of a bias voltage applied to the electrode and the active layer.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
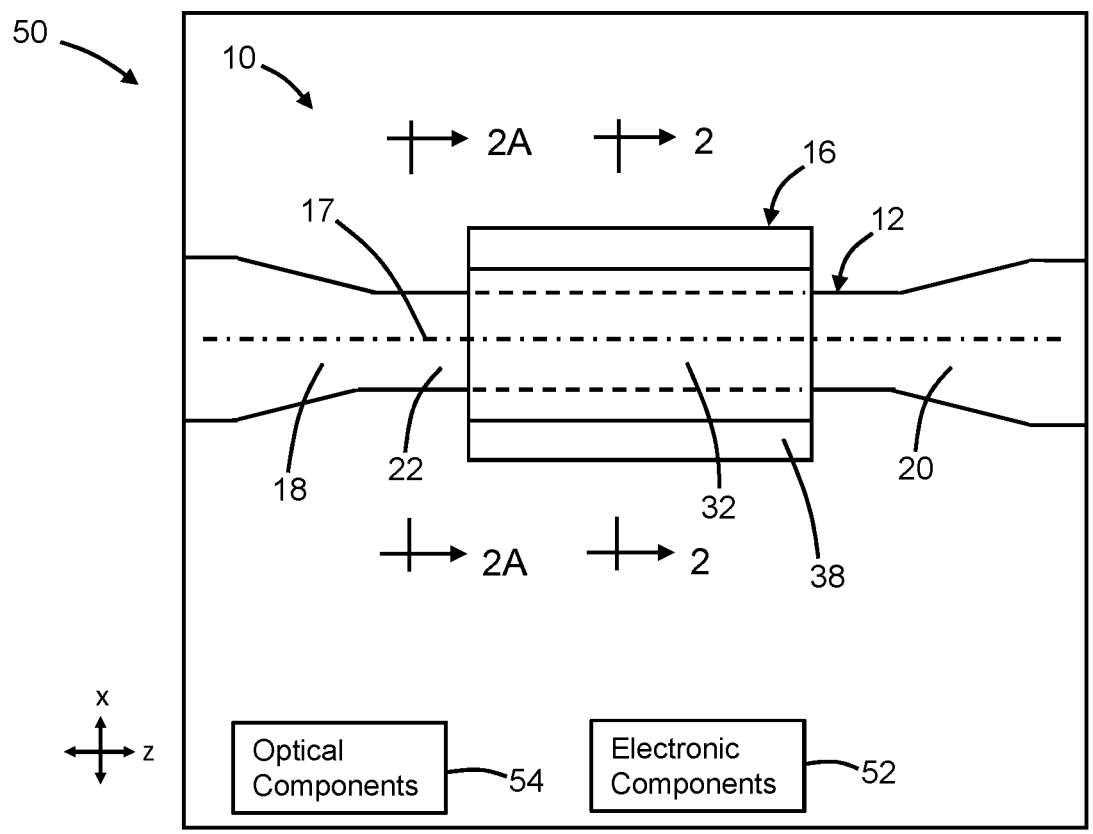
FIG. 1 is a diagrammatic top view of a photonics chip including a structure at an initial fabrication stage of a processing method in accordance with embodiments of the invention and in which some dielectric layers are omitted for clarity of description.
Figure 2:
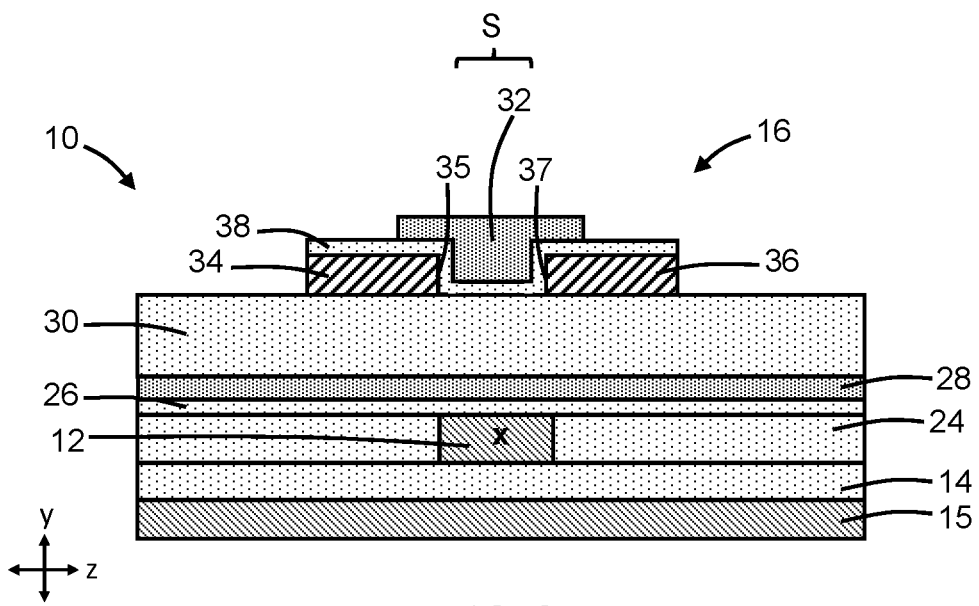
FIG. 2 is a cross-sectional view of the structure taken generally along line 2-2 in FIG. 1.
Figure 2A:
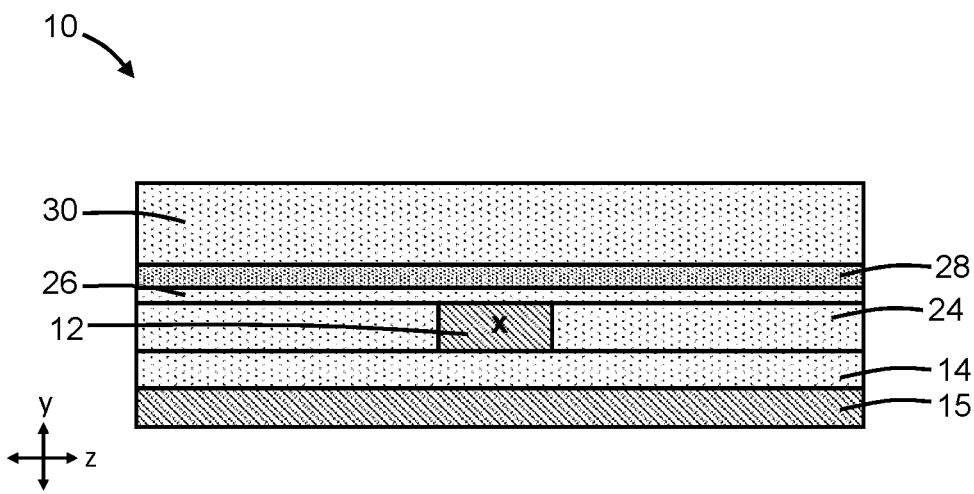
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12 arranged over a dielectric layer 14 and an electro-optic modulator 16 that is arranged over the waveguide core 12. The waveguide core 12 may include a taper 18 at an inlet or entrance to the structure 10, a taper 20 at an outlet or exit from the structure 10, and a straight section 22 arranged between the tapers 18, 20 along a longitudinal axis 17 of the waveguide core 12. The tapers 18, 20 may be omitted from the waveguide core 12 such that the waveguide core 12 only includes the straight section 22. However, the tapers 18, 20 may be used to narrow the straight section 22 in order to enhance and optimize phase matching with the electro-optic modulator 16.

The straight section 22 of the waveguide core 12 extends symmetrically along the longitudinal axis 17. In the representative embodiment, the straight section 22 is arranged along the longitudinal axis 17 between the taper 18 and the taper 20. The electro-optic modulator 16 may be fully arranged over the straight section 22 of the waveguide core 12 and may not extend to any other portion of the waveguide core 12, such as the tapers 18, 20. In an embodiment, the electro-optic modulator 16 may be fully arranged longitudinally over the straight section 22 of the waveguide core 12 and may be arranged fully between the respective interfaces between the straight section 22 and the tapers 18, 20. In an embodiment, the tapers 18, 20 may also be symmetrical relative to the longitudinal axis 17.

The waveguide core 12 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 14 and a substrate 15 composed of a single-crystal semiconductor material, such as single-crystal silicon, under the buried insulator layer. The waveguide core 12 may be patterned from the device layer of the silicon-on-insulator wafer by lithography and etching processes during front-end-of-line processing, and may be fully etched as shown or partially etched to define a ridge waveguide.

Dielectric layers 24, 26, 28, 30 composed of respective dielectric materials are sequentially formed over the waveguide core 12. The waveguide core 12 is embedded or buried in the dielectric material of the dielectric layer 24. The dielectric layer 26 is arranged over the dielectric layer 24, the dielectric layer 28 is arranged over the dielectric layer 26, and the dielectric layer 30 is arranged over the dielectric layer 26. The dielectric layer 24 may be composed of a dielectric material, such as silicon dioxide, deposited by chemical vapor deposition and planarized with, for example, chemical mechanical polishing (CMP). The dielectric layer 26 may be composed of dielectric material, such as silicon dioxide, deposited by chemical vapor deposition or atomic layer deposition over the dielectric layer 24. The dielectric layer 28 may be composed of dielectric material, such as silicon nitride, deposited by chemical vapor deposition or atomic layer deposition over the dielectric layer 26. The dielectric layer 30 may be composed of dielectric material, such as silicon dioxide, deposited by chemical vapor deposition using ozone and tetraethylorthosilicate (TEOS) as reactants. The dielectric layers 24, 26, 28, 30 are arranged in a vertical direction (i.e., the y-direction) between the waveguide core 12 and the electro-optic modulator 16 such that the waveguide core 12 and the electro-optic modulator 16 are separated and have a non-contacting relationship.

The electro-optic modulator 16 includes an electrode 34, an electrode 36 that is laterally spaced from the electrode 34, an active layer 32, and a dielectric layer 38. The electrodes 34, 36 are arranged as substantially parallel and truncated segments on the dielectric layer 30. The electrode 34 includes opposite sidewalls 35 that extend upwardly from the top surface of the dielectric layer 30, and the electrode 36 includes opposite sidewalls 37 that also extend upwardly from the top surface of the dielectric layer 30. Due to the parallel arrangement, one of the sidewalls 35 of the electrode 34 is located nearest to the sidewall 37 of the electrode 36 and is separated from the nearest sidewall 37 by a slot, S, that exposes a portion of the top surface of the dielectric layer 30. The slot, S, is fully filled by the materials of the dielectric layer 38 and the active layer 32. The dielectric layer 38 is arranged between the active layer 32 and each of the electrodes 34, 36, which operates to electrically isolate the active layer 32 from the electrodes 34, 36. Portions of the active layer 32 may be arranged in part over the electrodes 34, 36, which may promote the ability to contact the active layer 32 from above.

The electro-optic modulator 16 laterally overlaps in the x-direction and also in the z-direction with the straight section 22 of the waveguide core 12. The electro-optic modulator 16 is shorter than the straight section 22 of the waveguide core 12 along the longitudinal axis 17 of the waveguide core 12 (i.e., in the z-direction) and is wider than the straight section 22 of the waveguide core 12 in a direction transverse to the longitudinal axis 17 (i.e., in the x-direction). In an embodiment, the active layer 32 of the electro-optic modulator 16 may be arranged directly over the straight section 22 of the waveguide core 12, and the electrodes 34, 36 may be disposed on opposite sides of the straight section 22 of the waveguide core 12.

The electrodes 34, 36 may be formed by depositing a layer composed of a metal, such as copper or cobalt, by atomic layer deposition or chemical vapor deposition on the dielectric layer 30 and patterning the deposited layer with lithography and etching processes. The electrodes 34, 36 have substantially equal thicknesses because of being concurrently patterned from the same metal layer. After the electrodes 34, 36 are formed, the dielectric layer 38 may be formed by conformally depositing a layer composed of a dielectric material, such as silicon dioxide, by atomic layer deposition and patterning the deposited layer with lithography and etching processes. The dielectric layer 38 has substantially equal thicknesses on the sidewall 35 of the electrode 34, the sidewall 37 of the electrode 36, and the surface of the dielectric layer 30 between the sidewalls 35, 37. After the dielectric layer 38 is formed, the active layer 32 may be formed by depositing a layer composed of a tunable material by atomic layer deposition or chemical vapor deposition and patterning the deposited layer with lithography and etching processes. The active layer 32 has thicknesses within the slot on the sidewalls 35, 37, thicknesses on the top surfaces of the electrodes 34, 36, and a thickness on the top surface of the dielectric layer 30 between the sidewalls 35, 37, and these thicknesses may be substantially equal.

The active layer 32 may be composed of a material that is electro-optically active and has a permittivity (i.e., dielectric constant) that may be changed based on a change in a bias voltage and associated electric field applied to the active layer 32. The refractive index of the material contained in the active layer 32 is related to the permittivity and, for that reason, the refractive index of the material contained in active layer 32 can also be changed based on a change in an applied bias voltage. The refractive index of the material contained in the active layer 32 can be varied through the application of the bias voltage to effectively switch the electro-optic modulator 16 between different states for selectively transmitting propagating optical signals of a given wavelength through the structure 10. In an embodiment, the active layer 32 may be composed of a material that is a conductor. In an embodiment, the active layer 32 may be composed of indium-tin oxide (ITO). In an embodiment, the active layer 32 may be composed of another type of inorganic material, such as vanadium oxide and germanium-antimony telluride, or a combination of one or both of these materials with indium-tin oxide. In an embodiment, the active layer 32 may be composed of an electro-optic polymer or a liquid crystal.

Figure 3:
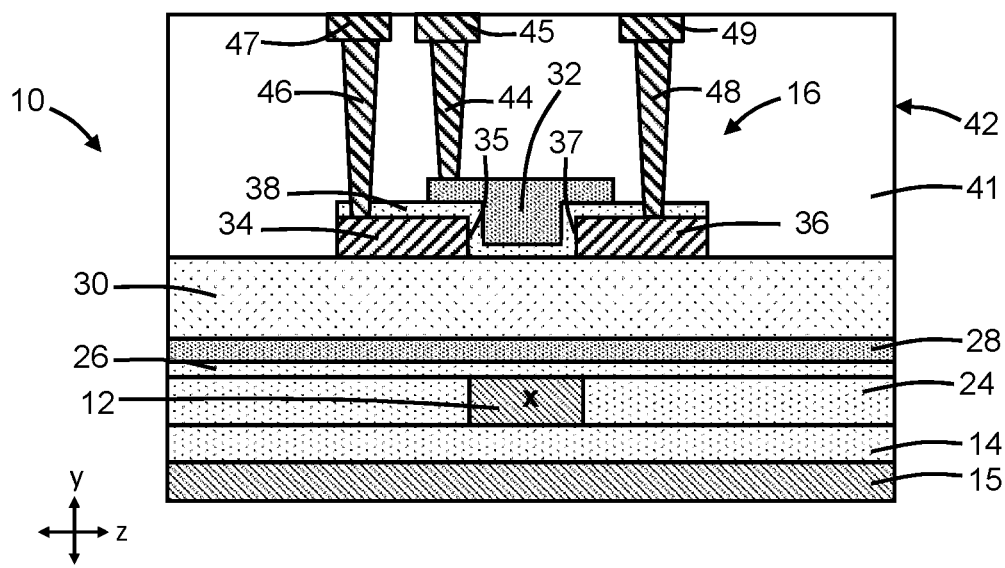
FIG. 3 is a cross-sectional view of the structure at a fabrication stage subsequent to FIG. 2.

With reference to FIG. 3 in which like reference numerals refer to like features in FIG. 2 and at a subsequent fabrication stage, a back-end-of-line stack, generally indicated by reference numeral 42, is formed by back-end-of-line (BEOL) processing over the electro-optic modulator 16. The back-end-of-line stack 42 may include one or more interlayer dielectric layers 41 composed of one or more dielectric materials, such as a carbon-doped silicon oxide, and metallization composed of, for example, copper, tungsten, and/or cobalt that is arranged in the one or more interlayer dielectric layers 41. In an embodiment, the electro-optic modulator 16 may be considered to be part of the back-end-of-line stack 42, and the dielectric layer 30 may constitute one of the interlayer dielectric layers 41.

The metallization may include a via 44 that connects the active layer 32 with a wire 45 in the back-end-of-line stack 42, a via 46 that connects the electrode 34 with a wire 47 in the back-end-of-line stack 42, and a via 48 that connects the electrode 36 with a wire 49 in the back-end-of-line stack 42. The vias 44, 46, 48 may be located in respective etched contact openings in the one or more dielectric layers 41. Through these connections, a switchable bias voltage may be applied from the wires 45, 47, 49 in the back-end-of-line stack 42 to generate the electric field that can produce the change in the refractive index of the material contained in the active layer 32.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

In use, phase matching between the waveguide core 12 at the input of the straight section 22 and the electro-optic modulator 16 is leveraged to modulate the optical signal that is provided to the straight section 22 at the output from the waveguide core 12. An optical signal propagating in the waveguide core 12 may enter the structure 10 at the taper 18 and may be shifted upwardly by the phase-matching between the straight section 22 and the electro-optic modulator 16. The electro-optic modulator 16 may be switched between 'ON' and 'OFF' conditions or states by selectively applying one or more bias voltages to the active layer 32 and electrodes 34, 36 such that the propagating optical signals can be either directed out of the plane of the electro-optic modulator 16 with a high coupling efficiency in one state or remain confined within the plane of the electro-optic modulator 16 with a low coupling efficiency in another state. For example, when a bias voltage (e.g., a negative bias voltage) is applied, the active layer 32 may have a low refractive index providing high absorption and the electro-optic modulator 16 is placed in an 'OFF' state characterized by a low coupling efficiency. As another example, when a bias voltage is not applied (e.g., a bias voltage of 0 volts), the active layer 32 may have a high refractive index providing low absorption and the electro-optic modulator 16 is placed in an 'ON' state characterized by a high coupling efficiency. The electro-optic modulator 16 may function as a plasmonic electro-optic modulator in which the optical signal interacts with electrons in the active layer 32 and electrodes 34, 36. The modulated optical signal is shifted downwardly by the phase-matching between the electro-optic modulator 16 and the straight section 22, and the modulated optical signal may exit the structure 10 through the taper 20 for further propagation through the waveguide core 12 to a destination on the photonics chip 50. Through the selective application of the bias voltage, a propagating optical received at the entrance to the structure 10 can be modulated for output at the exit from the structure 10.

Figure 4:
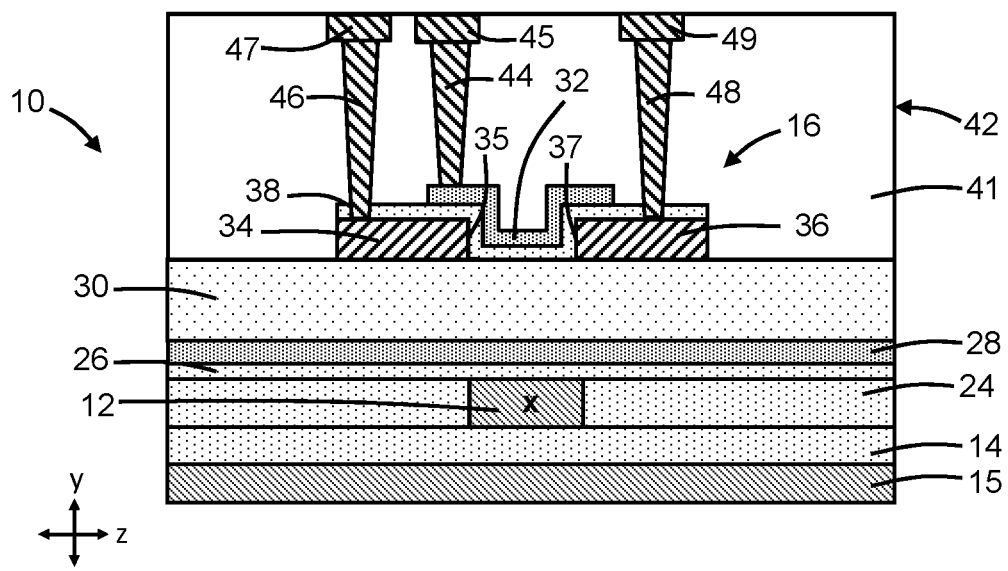
FIGS. 4 and 5 are cross-sectional views of structures in accordance with alternative embodiments of the invention.

With reference to FIG. 4 in which like reference numerals refer to like features in FIG. 3 and in accordance with alternative embodiments of the invention, the active layer 32 of the electro-optic modulator 16 may be deposited as a conformal layer that arranged over the dielectric layer 38 with a substantially uniform or equal thickness that covers all surfaces. To that end, the conductor contained in the active layer 32 may be conformally deposited by atomic layer deposition, and subsequently patterned with lithography and etching processes. The active layer 32 has substantially equal thicknesses on the dielectric layer 38 over the sidewall 35 of the electrode 34 and on the dielectric layer 38 over the sidewall 37 of the electrode 36, and on the dielectric layer 38 over the portion of the dielectric layer 30 that is arranged between the sidewalls 35, 37. In this embodiment, the slot, S, (FIG. 2) between the electrodes 34, 36 is only partially filled by the dielectric layer 38 and the active layer 32 with the remainder of the space filled by dielectric material from the one or more interlayer dielectric layers 41 of the back-end-of-line stack 42.

Figure 5:
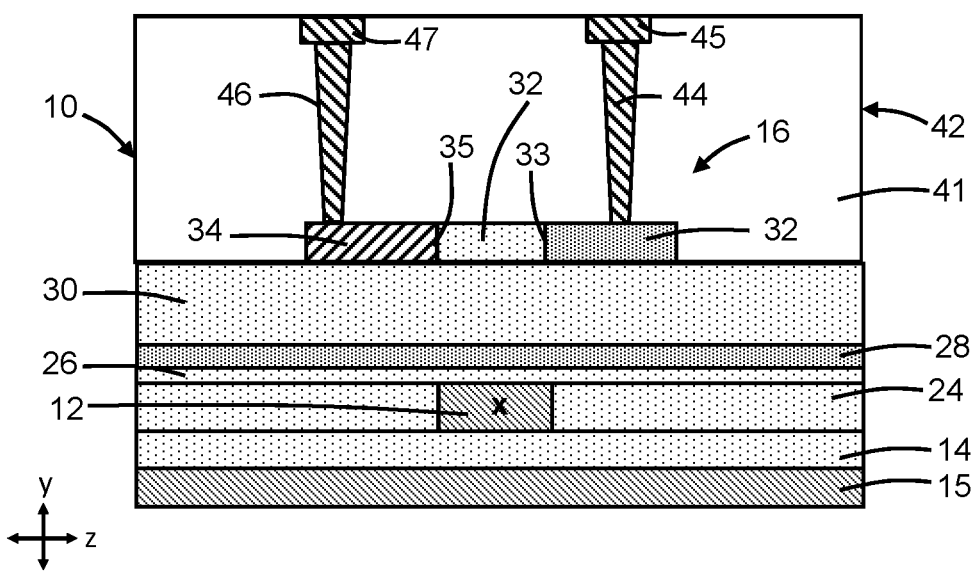

With reference to FIG. 5 in which like reference numerals refer to like features in FIG. 3 and in accordance with alternative embodiments of the invention, the dielectric layer 38, active layer 32, and electrode 34 may be rearranged such that the dielectric layer 38 is laterally arranged between the active layer 32 and electrode 34. The dielectric layer 38 is no longer conformal, and the electrode 36 is omitted from the construction of the electro-optic modulator 16. The dielectric layer 38, active layer 32, and electrode 34 have a juxtaposed or side-by-side arrangement instead of a layered arrangement. In that regard, the sidewall 35 of the electrode 34 is disposed adjacent to one sidewall of the dielectric layer 38, and the active layer 32 has a sidewall 33 that is disposed adjacent to one sidewall of the dielectric layer 38. In an embodiment, the sidewall 35 of the electrode 34 is in direct contact with the adjacent sidewall of the dielectric layer 38 and the sidewall 33 of the active layer 32 is in direct contact with the adjacent sidewall of the dielectric layer 38. In an embodiment, the active layer 32, electrode 34, and dielectric layer 38 may have substantially equal thicknesses. The juxtaposed arrangement of the dielectric layer 30, active layer 32, and electrode 34 may be utilized with a waveguide core 12 having the tapers 18, 20 of either orientation and location as shown in FIGS. 1, 5 or the tapers 18, 20 may be absent.

Figure 6:
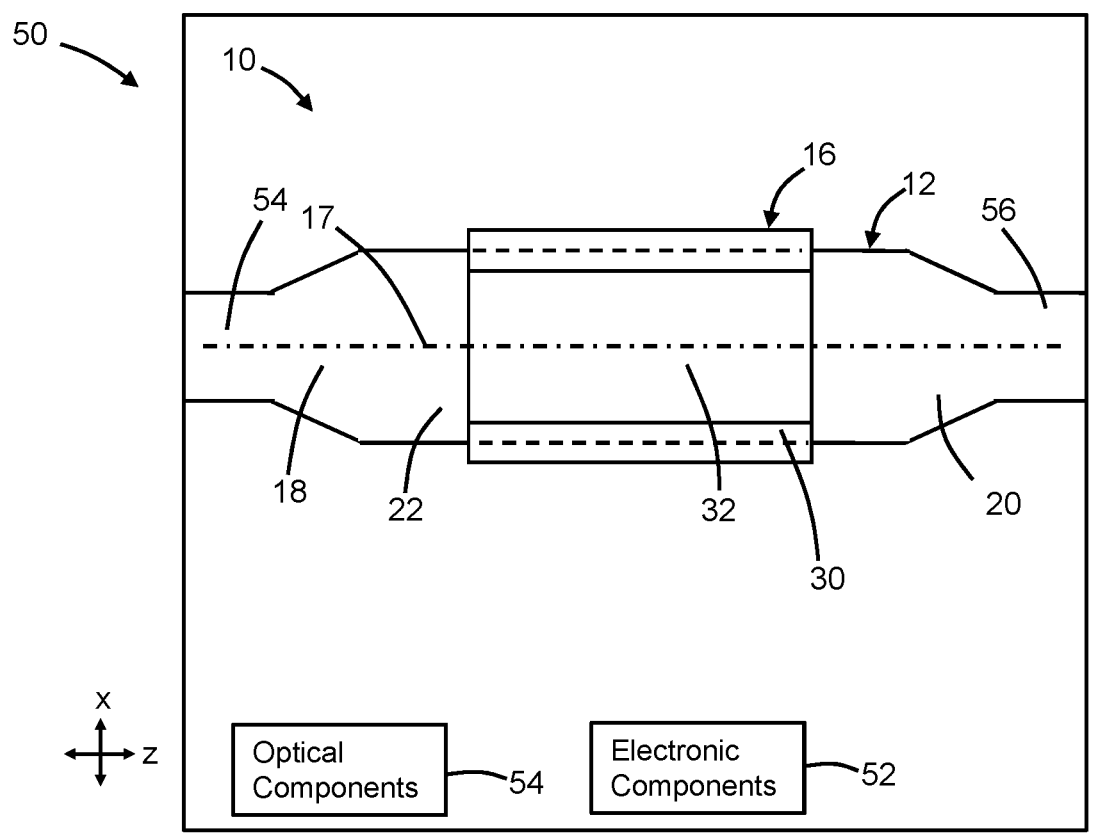
FIG. 6 is a top view of a structure in accordance with an alternative embodiment of the invention.

With reference to FIG. 6 in which like reference numerals refer to like features in FIG. 1 and in accordance with alternative embodiments of the invention, the tapers 18, 20 may be relocated and reoriented to effectively widen the straight section 22 beneath the electro-optic modulator 16 relative to the width of input and output waveguides 54, 56. Similar to the narrowing with the tapers 18, 20 (FIG. 1), widening with the reoriented and relocated tapers 18, 20 may be used to enhance and optimize the phase matching for optical signal transfer.

Figure 7:
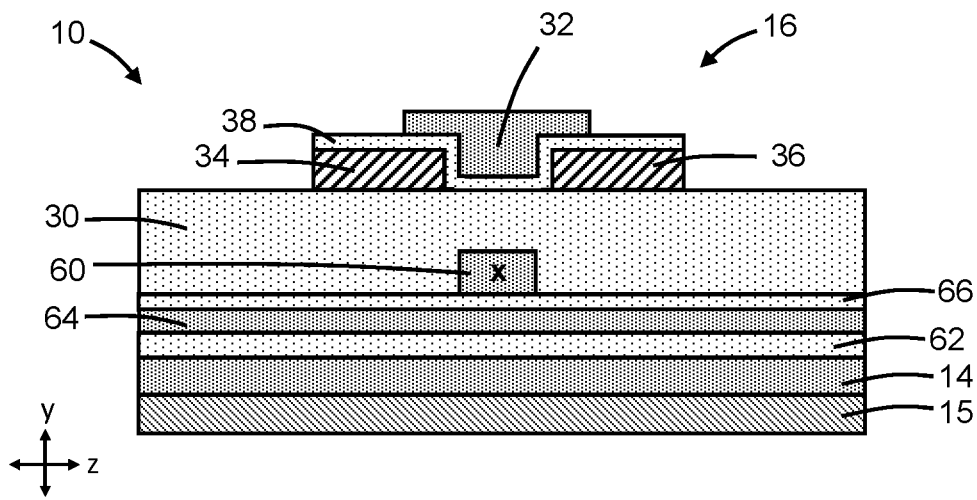
FIGS. 7 and 8 are cross-sectional views of structures in accordance with alternative embodiments of the invention.

With reference to FIG. 7 in which like reference numerals refer to like features in FIG. 2 and in accordance with alternative embodiments of the invention, the structure 10 may include a waveguide core 60 that is arranged over dielectric layers 62, 64, 66, and that is embedded in the dielectric layer 30. The waveguide core 60, which replaces the waveguide core 12, may be composed of a dielectric material, such as silicon nitride, that is patterned with lithography and etching processes. The waveguide core 60 is embedded or buried in the dielectric material of the dielectric layer 30. The dielectric layers 62 and 66 may be composed of a dielectric material, such as silicon dioxide, deposited by chemical vapor deposition or atomic layer deposition. The dielectric layer 64 is arranged between the dielectric layer 62 and the dielectric layer 66, and may be composed of silicon nitride by, for example, chemical vapor deposition or atomic layer deposition over the dielectric layer 62. The waveguide core 60 may include tapers similar to the tapers 18, 20 of FIGS. 1, 5 or with the tapers 18, 20 omitted. The electro-optic modulator 16 with the waveguide core 60 may include any of the configurations shown and described herein.

Figure 8:
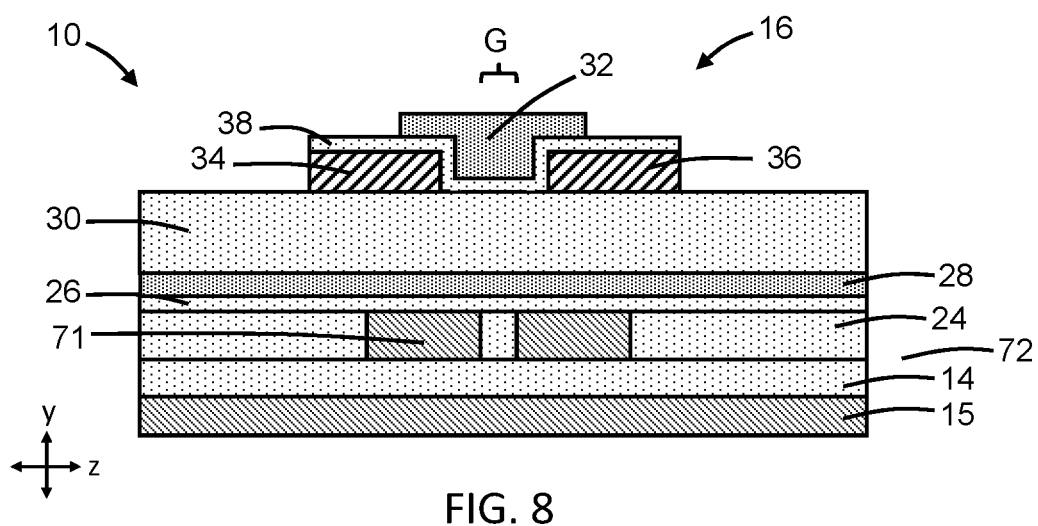

With reference to FIG. 8 in which like reference numerals refer to like features in FIG. 2 and in accordance with alternative embodiments of the invention, the waveguide core 12 may include a gap, G, that is laterally arranged between distinct sections 71, 72. To provide the sectioning, the gap, G, extends along the longitudinal axis of the slotted waveguide core 12. The slotted waveguide core 12 may include tapers similar to the tapers 18, 20 of FIGS. 1, 5 or the tapers 18, 20 may be absent. The waveguide core 60 may also be sectioned to include a gag similar to the gap, G.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a waveguide core; and
    an electro-optic modulator arranged over a portion of the waveguide core, the electro-optic modulator including a first electrode, a second electrode, an active layer, and a dielectric layer including a first portion and a second portion, the first electrode including a first sidewall, and the second electrode including a second sidewall spaced from the first sidewall of the first electrode by a slot,
    wherein the active layer includes a first portion positioned in the slot, the first portion of the dielectric layer is arranged in the slot between the first portion of the active layer and the first sidewall of the first electrode, the second portion of the dielectric layer is arranged in the slot between the first portion of the active layer and the second sidewall of the second electrode, and the active layer is comprised of a material having a refractive index that is a function of a bias voltage applied to the first electrode and the second electrode.

2. The structure of claim 1 wherein the material of the active layer is indium-tin oxide.

3. The structure of claim 1 wherein the portion of the waveguide core is a straight section having a longitudinal axis, and the electro-optic modulator is fully arranged along the longitudinal axis to overlap with the straight section of the waveguide core.

4. The structure of claim 3 wherein the waveguide core includes a first taper and a second taper, and the straight section is arranged along the longitudinal axis between the first taper and the second taper.

5. The structure of claim 1 further comprising:
    a back-end-of-line stack arranged over the electro-optic modulator, the back-end-of-line stack including a first via connected with the first electrode and a second via connected with the active layer.

6. The structure of claim 5 the back-end-of-line stack includes a third via connected with the second electrode.

7. The structure of claim 1 wherein the first portion of the dielectric layer has a first thickness, the second portion of the dielectric layer has a second thickness, and the first thickness is substantially equal to the second thickness.

8. The structure of claim 7 wherein the first portion of the active layer has a first thickness over the first portion of the dielectric layer on the first sidewall of the first electrode, the first portion of the active layer has a second thickness over the second portion of the dielectric layer on the second sidewall of the second electrode, and the first thickness is substantially equal to the second thickness.

9. The structure of claim 1 further comprising:
    a back-end-of-line stack including an interlayer dielectric layer arranged between the electro-optic modulator and the waveguide core.

10. The structure of claim 1 wherein the first electrode and the second electrode have substantially equal thicknesses.

11. The structure of claim 1 wherein the active layer includes a second portion arranged over the first electrode, and further comprising:
    a back-end-of-line stack arranged over the electro-optic modulator, the back-end-of-line stack including a first via connected with the first electrode and a second via connected with the second portion of the active layer.

12. The structure of claim 11 wherein the dielectric layer includes a third portion arranged between a top surface of the first electrode and the second portion of the active layer.

13. A method comprising:
    forming a waveguide core; and
    forming an electro-optic modulator that is arranged over a portion of the waveguide core,
    wherein the electro-optic modulator includes a first electrode, a second electrode, an active layer arranged adjacent to the first electrode, and a dielectric layer including a first portion and a second portion, the first electrode includes a first sidewall, the second electrode includes a second sidewall spaced from the first sidewall of the first electrode by a slot, the first portion of the dielectric layer is arranged in the slot between the active layer and the first sidewall of the first electrode, the second portion of the dielectric layer is arranged in the slot between the active layer and the second sidewall of the second electrode, and the active layer is comprised of a material having a refractive index that is a function of a bias voltage applied to the first electrode and the active layer.

14. The method of claim 13 wherein forming the electro-optic modulator that is arranged over the portion of the waveguide core comprises:

patterning a conductor layer to form the first electrode and the second electrode; and conformally depositing the active layer within the slot on the first sidewall of the first electrode and on the second sidewall of the second electrode.

15. The method of claim 14 wherein forming the electro-optic modulator that is arranged over the portion of the waveguide core further comprises:

conformally depositing the first portion of the dielectric layer within the slot on the first sidewall of the first electrode and the second portion of the dielectric layer within the slot on the second sidewall of the second electrode, wherein the active layer is conformally deposited over the first portion of the dielectric layer on the first sidewall of the first electrode and over the second portion of the second sidewall of the second electrode.

16. The method of claim 13 wherein forming the electro-optic modulator that is arranged over the portion of the waveguide core comprises:

patterning a conductor layer to form the first electrode and the second electrode; and depositing the active layer within the slot between the first sidewall of the first electrode and the second sidewall of the second electrode.

17. The method of claim 16 wherein forming the electro-optic modulator that is arranged over the portion of the waveguide core further comprises:

conformally depositing the first portion of the dielectric layer within the slot on the first sidewall of the first electrode and the second portion of the dielectric layer within the slot on the second sidewall of the second electrode.

18. The structure of claim 1 wherein the active layer is comprised of vanadium oxide, germanium-antimony telluride, or a combination of one or both of these materials with indium-tin oxide.

19. The structure of claim 1 wherein the active layer is comprised of an electro-optic polymer or a liquid crystal.

20. The structure of claim 1 wherein the dielectric layer is comprised of silicon dioxide, and the first electrode and the second electrode are comprised of a metal.

* * * * *